(12) United States Patent
Wada et al.

(10) Patent No.: US 10,343,073 B2
(45) Date of Patent: Jul. 9, 2019

(54) NON-TRANSITORY COMPUTER READABLE RECORDING MEDIUM, GAME CONTROL METHOD, SERVER DEVICE, AND INFORMATION PROCESSING SYSTEM

(71) Applicant: GREE, INC., Tokyo (JP)

(72) Inventors: Nariaki Wada, Tokyo (JP); Akira Usami, Tokyo (JP); Asuka Kawamura, Tokyo (JP); Shuichi Kura, Tokyo (JP); Taichi Wakabayashi, Tokyo (JP); Taishun Ko, Tokyo (JP); Totaro Nakashima, Tokyo (JP)

(73) Assignee: GREE, INC., Tokyo (JP)

( * ) Notice: Subject to any disclaimer, the term of this patent is extended or adjusted under 35 U.S.C. 154(b) by 281 days.

(21) Appl. No.: 14/482,507

(22) Filed: Sep. 10, 2014

(65) Prior Publication Data

US 2015/0182864 A1 Jul. 2, 2015

(30) Foreign Application Priority Data

Dec. 27, 2013 (JP) ................................ 2013-273252

(51) Int. Cl.
*A63F 9/24* (2006.01)
*A63F 13/00* (2014.01)
(Continued)

(52) U.S. Cl.
CPC ............ *A63F 13/822* (2014.09); *A63F 13/35* (2014.09); *A63F 13/537* (2014.09); *A63F 13/56* (2014.09)

(58) Field of Classification Search
USPC .................... 463/1, 9, 20, 22, 30, 31, 39, 42
See application file for complete search history.

(56) References Cited

U.S. PATENT DOCUMENTS

2003/0060248 A1* 3/2003 Yamashita ............. A63F 13/10
463/1
2007/0260687 A1* 11/2007 Rao ...................... H04L 12/1827
709/204
(Continued)

FOREIGN PATENT DOCUMENTS

JP 2000-126451 A 5/2000
JP 2000167247 A 6/2000
(Continued)

OTHER PUBLICATIONS

Apr. 1, 2014 Office Action issued in Japanese Application No. 2013-273252 (with translation).
(Continued)

*Primary Examiner* — Adetokunbo O Torimiro
(74) *Attorney, Agent, or Firm* — Oliff PLC

(57) ABSTRACT

A non-transitory computer readable recording medium has stored thereon instructions to be executed on a computer providing terminal devices (12) with a battle game in which users each operate a unit. The instructions cause the computer to perform the steps of: determining a unit parameter of each of a plurality of units, group information being associated with each unit and indicating a group, among a plurality of groups, to which the unit belongs; deploying the units on a field (23), divided into regions, in the battle game; varying the unit parameter of a first unit on the field based on the group information associated with the first unit and the group information associated with a second unit on the field (23), the second unit having a predetermined positional relationship with the first unit; and conducting a battle between the first unit and other units using the varied unit parameter.

12 Claims, 13 Drawing Sheets

(51) Int. Cl.
  G06F 17/00   (2006.01)
  G06F 19/00   (2018.01)
  A63F 13/822  (2014.01)
  A63F 13/537  (2014.01)
  A63F 13/35   (2014.01)
  A63F 13/56   (2014.01)

(56) References Cited

U.S. PATENT DOCUMENTS

| | | | | |
|---|---|---|---|---|
| 2011/0237334 A1* | 9/2011 | Aiba | ............... | A63F 13/12 463/42 |
| 2013/0130791 A1* | 5/2013 | Myogan | ............... | A63F 13/60 463/30 |
| 2013/0165233 A1* | 6/2013 | Wada | ............... | A63F 13/85 463/42 |
| 2014/0066199 A1* | 3/2014 | Takagi | ............... | A63F 13/35 463/31 |

FOREIGN PATENT DOCUMENTS

| | | |
|---|---|---|
| JP | A-2000-325528 | 11/2000 |
| JP | 2007061340 A | 3/2007 |
| JP | 2008136631 A | 6/2008 |
| JP | A-2008-220984 | 9/2008 |
| JP | 2009-247474 A | 10/2009 |
| JP | 2013202406 A | 10/2013 |
| JP | 2013202410 A | 10/2013 |
| JP | 2013208220 A | 10/2013 |
| JP | 2013240572 A | 12/2013 |
| JP | 2013248379 A | 12/2013 |
| JP | 2014000103 A | 1/2014 |
| JP | 2014000382 A | 1/2014 |
| JP | 2014050744 A | 3/2014 |
| JP | 2014090974 A | 5/2014 |
| JP | 2014136001 A | 7/2014 |
| JP | 2014179058 A | 9/2014 |
| JP | 5600205 B1 | 10/2014 |
| JP | 2014188181 A | 10/2014 |
| JP | 2014200395 A | 10/2014 |
| JP | 2014213159 A | 11/2014 |
| JP | 2015008825 A | 1/2015 |
| JP | 2015016263 A | 1/2015 |
| JP | 2015024027 A | 2/2015 |
| JP | 2015024115 A | 2/2015 |
| JP | 2015047469 A | 3/2015 |
| JP | 2015047491 A | 3/2015 |
| JP | 2015066141 A | 4/2015 |
| JP | 2015066371 A | 4/2015 |
| JP | 5723578 B1 | 6/2015 |
| JP | 2015-126808 A | 7/2015 |

OTHER PUBLICATIONS

Jun. 10, 2014 Office Action issued in Japanese Application No. 2013-273252 (with translation).
Aug. 19, 2014 Office Action issued in Japanese Application No. 2014-144451 (with translation).
Nishikawa, "Complete Guide to Age of Empires II: Age of Kings," Network Game, Feb. 22, 2000, $2^{nd}$ edition, pp. 4-8, 46-47, 90, 180, 191, Softbank Publishing Inc. (with partial translation).
"Hero's Saga: Laevatein, Dengeki DS & Wii," *Ascii Media Works*, Jan. 1, 2009, vol. 9 No. 2, pp. 90-91 (with partial translation).
Dec. 16, 2014 Decision of Dismissal of Amendment issued in Japanese Application No. 2014-144451.
Dec. 16, 2014 Official Decision of Refusal issued in Japanese Application No. 2014-144451.
Ohta et al., "Master Series, Ambition of NobunagaITenshoki Master Book," Koei Co., Ltd., Aug. 15, 1995, 1st ed., pp. 47-48.
Koyanagi et al., "Shibusawa Ko Series, Ambition of Nobunaga/Tenshoki Handbook," Koei Co., Nov. 20, 1996,4 6th ed., pp. 96-97.
Apr. 18, 2017 Office Action issued in Japanese Patent Application No. 2015-052249.
Yahoo Japan Corporation. "Please Tell Me About the Battlefield of Seisen Cerberus". Yahoo! Answers, [searched on Apr. 12, 2017], URL, https://detail.chiebukuro.yahoo.co.jp/qa/question_detail/q1180643126, Feb. 6, 2012.
Takasuke Kitade et al., "Gunparade Orchestra, Chapter Green, Wolf and His Boy, The Complete Guide". Mediaworks Corporation, First Version, pp. 108-109, see "follow" command in the table of "Command Type" at the bottom of p. 109, Jun. 20, 2006.
Outline / FF11 Terminology Dictionary, Fellow of Windas version, [searched on Apr. 12, 2017] URL, https://web-beta.archive.org/web/20121112054245/http://wiki.ffo.jp/html/4173.html. Nov. 12, 2012.
Jun. 27, 2017 Office Action issued in U.S. Appl. No. 15/475,767.
Aug. 8, 2017 Office Action issued in Japanese Patent Application No. 2015-052249.
Jul. 18, 2017 Office Action issued in Japanese Patent Application No. 2017-119332.
Sato, Minoru et al. "Super Robot War K Players' Bible" Enterbrain K.K., 1st edition, pp. 006-007, 022-029, 034-035, Apr. 6, 2009.
Mobile Suit Gundam—Traces of White Base, Dengeki PlayStation, Ascii Media Works K.K., vol. 17, No. 35, p. 208, Dec. 8, 2011.
Mobile Suit Gundam—Traces of White Base, Weefly FamiTsu, Enterbrain K.K., vol. 26, No. 51, pp. 164-165, Dec. 1, 2011.
Hoshi, Tatsuya et al. "Wonder Life Special" [Nintendo Official Guide Book], Famicom Wars DS, Shogakukan Inc., 1st edition, 1st print, pp. 11, 18, 49, Sep. 10, 2005.
Jan. 9, 2018 Office Action issued in Japanese Patent Application No. 2017-119332.
Jan. 9, 2018 Office Action issued in Japanese Patent Application No. 2017-230126.
Enterbrain K.K. "Playing Now, Free Online Game Title 100 for the Year-End and New Year Holidays". FamiTsu Connect! on. vol. 38, p. 9, Jan. 7, 2010.
Sato, Minoru et al. "Super Robot War K Players' Bible" Enterbrain K.K., 1st edition, pp. 4, 6-7, 12, 22-29, 36-37, Apr. 6, 2009.
Takasuke Kitade et al., "Gunparade Orchestra, Chapter Green, Wolf and His Boy, The Complete Guide". Mediaworks Corporation, 1st Version, pp. 108-110, Jun. 20, 2006.
Media Works Inc. "Tactics Ogre Perfect Manual". pp. 2-6, 62 and 63, Jan. 10, 1997.
Quest Co., Ltd. Super Famicom "Tactics Ogre" Manual, Oct. 6, 1995.
Ascii Media Works Inc. "Dengeki Games". vol. 14, pp. 22-27, Dec. 14, 2010.
4Gamer.net "Chevalier Saga Tactics". 4Gamer.net, Interview 2012, Jan. 26, 2012.
4Gamer.net "Chevalier Saga Tactics". 4Gamer.net, Interview 2011, Aug. 25, 2011.
Nov. 30, 2017 Office Action issued in U.S. Appl. No. 15/475,767.
May 30, 2018 Office Action issued in U.S. Appl. No. 15/475,767.
Apr. 17, 2018 Office Action issued in Japanese Patent Application No. 2017-230126.
Colourfiled Inc./ Enterbrain K.K., Hamamura Hirokazu, "Valkyria Chronicles II, Gallia Royal Military Academy, Complete Guide", 1st Edition, pp. 27-28, 475, Mar. 30, 2010.
Miya. "Damage of Dageki". Dragon Quest IV Capture, http://miya.s16.xrea.com/dq/4/battle/dm_dageki.html, Dec. 4, 2007.
Shin. "DQ10 Characteristics of Weapon Etc". Shin-san no Shucchoujo Hatena Hen, http://d.hatena.ne.jp/shin/20120911/pl, Sep. 11, 2012.
Asuka. "Details and Method of Enhancing Offensive Power". FF2(Final Fantasy II) The Strongest Capture with Map for WSC-PS-PS GA Version(PS3/PSP/Vita) System: g-hat, http://ff2.g-hat.info/ps/79.htm, Feb. 16, 2012.
Matsukaze. "The Strongest Weapon, Recommendation?". FF13-2 Kouryaku DE.com, http://blog.game-de.com/ff13-2/f132-buki/, May 10, 2012.
Kadokawa Corporation. "Tactics Ogre: Wheel of Fortune, 2nd Interview With Minagawa-San, Focus on the Picture". Wikipedia, http://dengekionline.com/elem/000/000/299/299884/, Sep. 10, 2013.
Aetas, Inc. "Chevalier Saga Tactics". Implementation of New System "Ranking of Exercise" and WizardUnit "Demon Crowley" [4Gamer.net], https://www.4gamer.net/games/124/G012492/20120126059/, Jan. 26, 2012.

(56) References Cited

OTHER PUBLICATIONS

Aetas, Inc. "Chevalier Saga Tactics". Implementation of Guild Siege Battle by updating [4Gamer.net], https://www.4gamer.net/games/124/G012492/20120308081/, Mar. 8, 2012.
Oct. 23, 2018 Office Action issued in Japanese Patent Application No. 2018-147406.
hlamamura Koichi/Enterbrain K.K. "Enterbrain Mook Arcadia Extra". Eternal Wheel-Starting Guide Book, 1st Edition, vol. 56, pp. 16 and 18, Apr. 10, 2008.
Inaba Toshio/Softbank Publishing Inc. "Color Field, Dorimagabooks, Advanced Grand Strategy~Storm of Europe • German Blitz Tactics~". Capture Guide, 1st Edition, p. 12, Sep. 12, 2000.
Shogakukan Inc. "Group Crambom, Grand Strategy for Windows Macintosh". Perfect Guide, 1st Edition, pp. 15, 18, 23-24.
Enterbrain K.K. "Fantasy Earth the Ring of Dominion". Beginner's Play Guide, p. 4, Feb. 28, 2006.
Comment on Riot Stars, http://www.geocities.jp/wonsishijyou/raiato.htm, Aug. 6, 2010 (Searched on Oct. 2, 2018).
Supercell, "First Argument Document by Obligors". submitted in Case No. 29(YO) 22045 of JP Patent No. 5600205, Aug. 25, 2017.
Supercell, "Second Argument Document by Obligors". submitted in Case No. 29(YO) 22045 of JP Patent No. 5600205, Oct. 13, 2017.
Gree, "Third Argument Document". submitted in Case No. 29(YO) 22045 of JP Patent No. 5600205, Nov. 9, 2017.
Supercell, "Fourth Argument Document by Obligors (invalidity argument)". submitted in Case No. 29(YO) 22045 of JP Patent No. 5600205, Dec. 21, 2017.
Gree, "Fourth Argument Document". submitted in Case No. 29(YO) 22045 of JP Patent No. 5600205, Jan. 22, 2018.
Supercell, "Fifth Argument Document by Obligors (invalidity argument)". submitted in Case No. 29(YO) 22045 of JP Patent No. 5600205, Jan. 17, 2018.
Gree, "Fifth Argument Document". submitted in Case No. 29(YO) 22045 of JP Patent No. 5600205, Mar. 1, 2018.
Supercell, "Seventh Argument Document by Obligors (invalidity argument)". submitted in Case No. 29(YO) 22045 of JP Patent No. 5600205, Feb. 23, 2018.
Gree, "Sixth Argument Document". submitted in Case No. 29(YO) 22045 of JP Patent No. 5600205, Apr. 12, 2018.
Supercell, "Eighth Argument Document by Obligors (invalidity argument)". submitted in Case No. 29(YO) 22045 of JP Patent No. 5600205, Apr. 2, 2018.
Gree, "Seventh Argument Document". submitted in Case No. 29(YO) 22045 of JP Patent No. 5600205, May 30, 2018.
Supercell, "Tenth Argument Document by Obligors (invalidity argument)". submitted in Case No. 29(YO) 22045 of JP Patent No. 5600205, May 15, 2018.
Supercell's Agent, "Actual Machine Report". submitted in Case No. 29(YO) 22045 of JP Patent No. 5600205, May 15, 2018.
Mar. 5, 2019 Office Action issued in Japanese Patent Application No. 2018-147406.

* cited by examiner

FIG. 2

| User ID | Unit parameter | | | | | Information on cards in possession | Deck information | Unit type information | Group information |
|---|---|---|---|---|---|---|---|---|---|
| | HP | AT | DF | Movement range | Attack range | | | | |
| 001 | ** | ** | ** | ** | ** | Information on cards in possession 001 | Deck information 001 | Unit type 1 | Group A |
| 002 | ** | ** | ** | ** | ** | Information on cards in possession 002 | Deck information 002 | Unit type 2 | Group B |
| 003 | ** | ** | ** | ** | ** | Information on cards in possession 003 | Deck information 003 | Unit type 3 | Group C |
| ... | ... | ... | ... | ... | ... | ... | ... | ... | ... |

| Card ID | Card parameter | | | Card attribute information |
|---|---|---|---|---|
| | HP | AT | DF | |
| card 01 | **** | **** | **** | Card attribute 1 |
| card 02 | **** | **** | **** | Card attribute 2 |
| ... | ... | ... | ... | ... |
| card 99 | **** | **** | **** | Card attribute 6 |

FIG. 5

| Unit parameter | Card ID | Card parameter | | | Card attribute information |
|---|---|---|---|---|---|
| | | HP | AT | DF | |
| HP | card 01 | **** | **** | **** | Card attribute 1 |
| | card 02 | **** | **** | **** | Card attribute 2 |
| | card 03 | **** | **** | **** | Card attribute 3 |
| AT | card 04 | **** | **** | **** | Card attribute 4 |
| | card 05 | **** | **** | **** | Card attribute 5 |
| | card 06 | **** | **** | **** | Card attribute 6 |
| DF | card 07 | **** | **** | **** | Card attribute 1 |
| | card 08 | **** | **** | **** | Card attribute 2 |
| | card 09 | **** | **** | **** | Card attribute 3 |

FIG. 6

| Unit type information | Movement range | Attack range | Specialty card attribute |
|---|---|---|---|
| Unit type 1 | 1 | 1 | Card attributes 1, 2 |
| Unit type 2 | 1 | 3 | Card attributes 3, 4 |
| Unit type 3 | 2 | 2 | Card attributes 5, 6 |

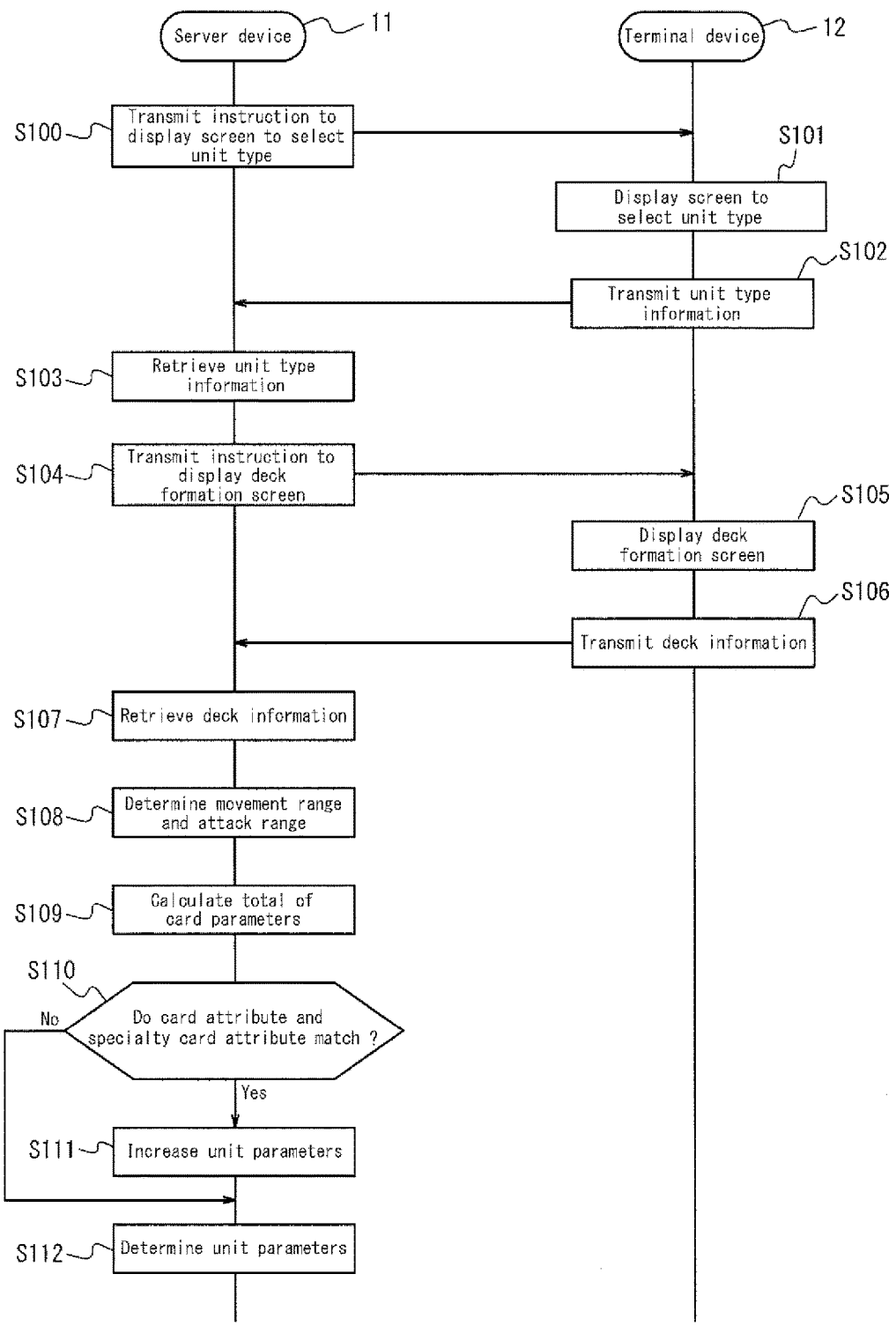

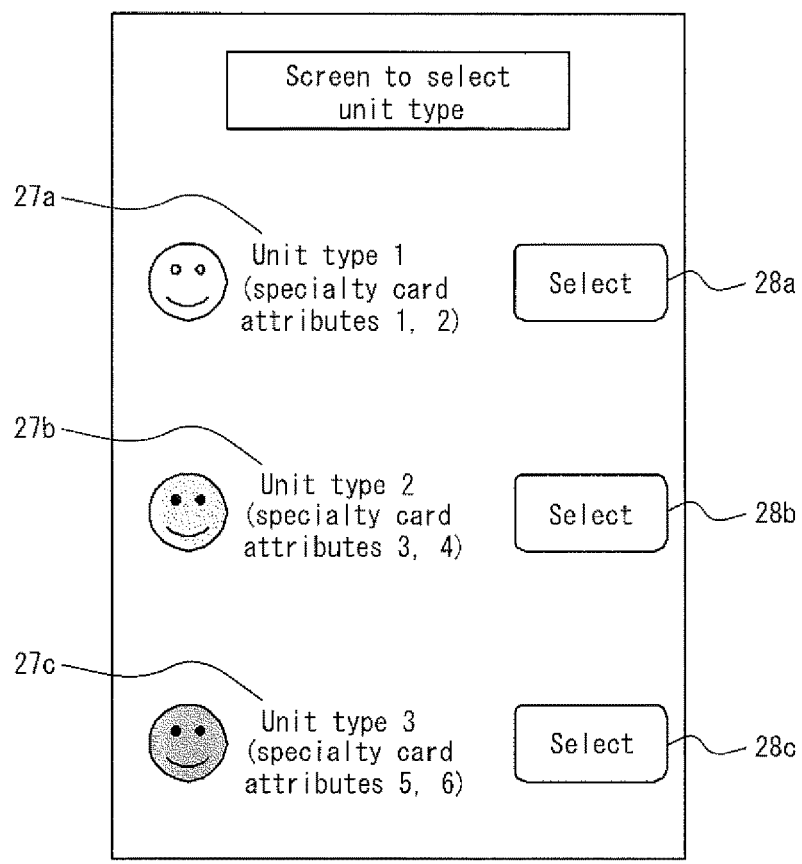

NON-TRANSITORY COMPUTER READABLE RECORDING MEDIUM, GAME CONTROL METHOD, SERVER DEVICE, AND INFORMATION PROCESSING SYSTEM

CROSS-REFERENCE TO RELATED APPLICATION

This application claims priority to and the benefit of Japanese Patent Application No. 2013-273252 filed Dec. 27, 2013, the entire contents of which are incorporated herein by reference.

TECHNICAL FIELD

The present invention relates to a non-transitory computer readable recording medium storing instructions to be executed on a computer, to a game control method, to a server device, and to an information processing system that provide a battle game to a terminal device.

BACKGROUND ART

Conventionally, in a battle game server, each user's deck is formed by a plurality of battle cards or the like stored for each user, and the battle game server allows a plurality of users to compete with each other based on a total value or the like of parameters such as attack strength, defense strength, and the like of the cards in the deck (for example, see Patent Literature 1 and 2).

CITATION LIST

Patent Literature

Patent Literature 1: JP2008-220984A
Patent Literature 2: JP2000-325528A

SUMMARY OF INVENTION

Technical Problem

In a conventional battle game server, however, the strength of a deck depends greatly on the number of cards the user holds. For example, it is difficult for a user who does not hold cards having high parameters to win against a deck formed only by cards having high parameters. Therefore, the result of a battle ends up being largely decided at the time the deck is formed, causing the user to lose interest in the game.

The present invention has been conceived in light of these circumstances and provides a non-transitory computer readable recording medium storing instructions to be executed on a computer, a game control method, a server device, and an information processing system that can provide a battle game that dynamically varies parameters in accordance with game progress.

Solution to Problem

A non-transitory computer readable recording medium according to the present invention has stored thereon instructions to be executed on a computer providing a battle game to a plurality of terminal devices, a plurality of users each operating a unit to battle in the battle game, the instructions causing the computer to perform the steps of: determining a unit parameter of each of a plurality of units, group information being associated with each unit and indicating a group, among a plurality of groups, to which the unit belongs; deploying the plurality of units on a field in the battle game, the field being divided into a plurality of regions; varying the unit parameter of a first unit on the field based on the group information associated with the first unit and the group information associated with a second unit on the field, the second unit having a predetermined positional relationship with the first unit; and conducting a battle between the first unit and other units using the varied unit parameter.

In the non-transitory computer readable recording medium according to the present invention, in the step of varying the unit parameter, when the first unit and the second unit belong to the same group, the unit parameter of the first unit is preferably varied by being increased.

In the non-transitory computer readable recording medium according to the present invention, in the step of varying the unit parameter, when the first unit and the second unit belong to different groups, the unit parameter of the first unit is preferably varied by being decreased.

In the non-transitory computer readable recording medium according to the present invention, in the step of varying the unit parameter, when the first unit, the second unit, and a third unit that has been established as a target of attack by the first unit or that has established the first unit as a target of attack belong to different groups, and the second unit comprises a plurality of units, the unit parameter of the first unit is preferably varied by being decreased.

In the non-transitory computer readable recording medium according to the present invention, the instructions preferably further cause the computer to perform the step of: upon receiving, from the terminal device of a user, an accompaniment request that designates another unit belonging to the same group as the unit operated by the user, causing the unit to act automatically so that on the field, the unit has the predetermined positional relationship with the other unit.

In the non-transitory computer readable recording medium according to the present invention, the instructions preferably further cause the computer to perform the step of: retrieving, from the terminal device, deck information including identifiers of a plurality of game media, wherein the unit preferably includes a plurality of unit parameters, and in the step of determining the unit parameter, the plurality of unit parameters are preferably each determined based on a portion of the plurality of game media.

In the non-transitory computer readable recording medium according to the present invention, one of a plurality of game medium attributes is preferably associated with each of the game media, and the instructions preferably further cause the computer to perform the steps of: receiving unit type information indicating a type of the unit from the terminal device; and increasing the unit parameters when the game medium attribute of any of the game media held by the user matches a predetermined game medium attribute corresponding to the type of the unit.

In the non-transitory computer readable recording medium according to the present invention, the instructions preferably further cause the computer to perform the steps of: upon receiving, from the terminal device of a user, an accompaniment request that designates another unit belonging to the same group as the unit operated by the user, causing the unit to act automatically so that on the field, the unit has the predetermined positional relationship with the other unit, wherein in the step of varying the unit parameter, when the first unit and the second unit belong to the same group, the unit parameter of the first unit is preferably varied by being increased.

In the non-transitory computer readable recording medium according to the present invention, the predetermined positional relationship is preferably a positional relationship such that the first unit is included in an attack range of the second unit, and in the step of varying the unit parameter, when the first unit, the second unit, and a third unit that has been established as a target of attack by the first unit or that has established the first unit as a target of attack belong to different groups, and the second unit comprises a plurality of units, the unit parameter of the first unit is preferably varied by being decreased.

A game control method according to the present invention is used in a computer providing a battle game to a plurality of terminal devices, a plurality of users each operating a unit to battle in the battle game, the game control method comprising the steps of: determining a unit parameter of each of a plurality of units, group information being associated with each unit and indicating a group, among a plurality of groups, to which the unit belongs; deploying the plurality of units on a field in the battle game, the field being divided into a plurality of regions; varying the unit parameter of a first unit on the field based on the group information associated with the first unit and the group information associated with a second unit on the field, the second unit having a predetermined positional relationship with the first unit; and conducting a battle between the first unit and other units using the varied unit parameter.

A server device according to the present invention is for providing a battle game to a plurality of terminal devices, a plurality of users each operating a unit to battle in the battle game, the server device comprising: means for determining a unit parameter of each of a plurality of units, group information being associated with each unit and indicating a group, among a plurality of groups, to which the unit belongs; means for deploying the plurality of units on a field in the battle game, the field being divided into a plurality of regions; means for varying the unit parameter of a first unit on the field based on the group information associated with the first unit and the group information associated with a second unit on the field, the second unit having a predetermined positional relationship with the first unit; and means for conducting a battle between the first unit and other units using the varied unit parameter.

An information processing system according to the present invention is for executing a game, the information processing system comprising: a server device; and at least one terminal device, the server device comprising: means for determining a unit parameter of each of a plurality of units, group information being associated with each unit and indicating a group, among a plurality of groups, to which the unit belongs; means for deploying the plurality of units on a field in the battle game, the field being divided into a plurality of regions; means for varying the unit parameter of a first unit on the field based on the group information associated with the first unit and the group information associated with a second unit on the field, the second unit having a predetermined positional relationship with the first unit; and means for conducting a battle between the first unit and other units using the varied unit parameter, and the terminal device comprising: means for displaying the field.

Advantageous Effect of Invention

According to the non-transitory computer readable recording medium, game control method, server device, and information processing system of the present invention, it is possible to provide a battle game that dynamically varies parameters in accordance with game progress.

BRIEF DESCRIPTION OF DRAWINGS

The present invention will be further described below with reference to the accompanying drawings, wherein:

FIG. 2 illustrates an example of the user information in FIG. 1;

FIG. 4 illustrates an example of the information on cards in possession in FIG. 2;

FIG. 5 illustrates an example of the deck information in FIG. 2;

FIG. 6 illustrates an example of information associated with the unit type information in FIG. 2;

FIG. 7 is a flowchart illustrating operations of the game system in FIG. 1;

FIG. 8 illustrates an example of a game screen displayed on the display module in FIG. 1;

DESCRIPTION OF EMBODIMENTS

The following describes an embodiment of the present invention.

First, an outline of the battle game according to the present embodiment is provided. The battle game according to the present embodiment has two battle modes: regular battle and group battle. The regular battle is a battle mode for a user to acquire game media (cards), game items, and the like by using individual game media that the user holds in order to battle an opponent or complete a mission (quest) within the game. In a regular battle, a user can also cooperate with another user to battle an enemy boss. A group battle is a real-time battle mode for multiple users whereby a user deploys a unit on a field within the game, the unit being formed with a plurality of game media acquired in regular battles, and operates the unit by taking actions such as moving and attacking in order to battle other units operated by a plurality of users. The game media are described here as being game cards, yet any media within the game may be used, such as characters, weapons, armor, items, or the like.

In the battle game, a group battle takes place as a limited-time event, for example. During this group battle, each unit belongs to one of three groups, and victory or defeat is determined by group. The user may select the group to which the unit belongs, or the server may automatically select the group based on the user's status or cards in possession. A group battle ends after a predetermined time has elapsed from the start of the battle (for example, 30 minutes). The user can cause the unit to act once every predetermined time period (for example, 5 seconds). Therefore, the number of times a unit can act in a group battle is limited. The timing for causing units to act may be the same for all units that are participating in the group battle. During one action, the unit can either move or attack, for example. The user obtains points by attacking units of other groups or by capturing strongholds on the field. A stronghold has, for example, parameters similar to a unit, such as stamina, and is captured by the group that reduces the stamina of the stronghold to zero by attacking with a unit. At the end of the battle, the group that has captured the stronghold can obtain additional points. A plurality of strongholds may be arranged on the field.

Victory or defeat in the group battle, as well as the game media, items, or the like provided as a reward are determined in accordance with the number of points obtained by the end of the battle. The user can also obtain game media, items, or the like arranged on the field by, for example, causing the unit to pick them up. The game media, items, or the like that the user obtains in the group battle may be usable not only in a group battle but also in a regular battle.

Figure 1:
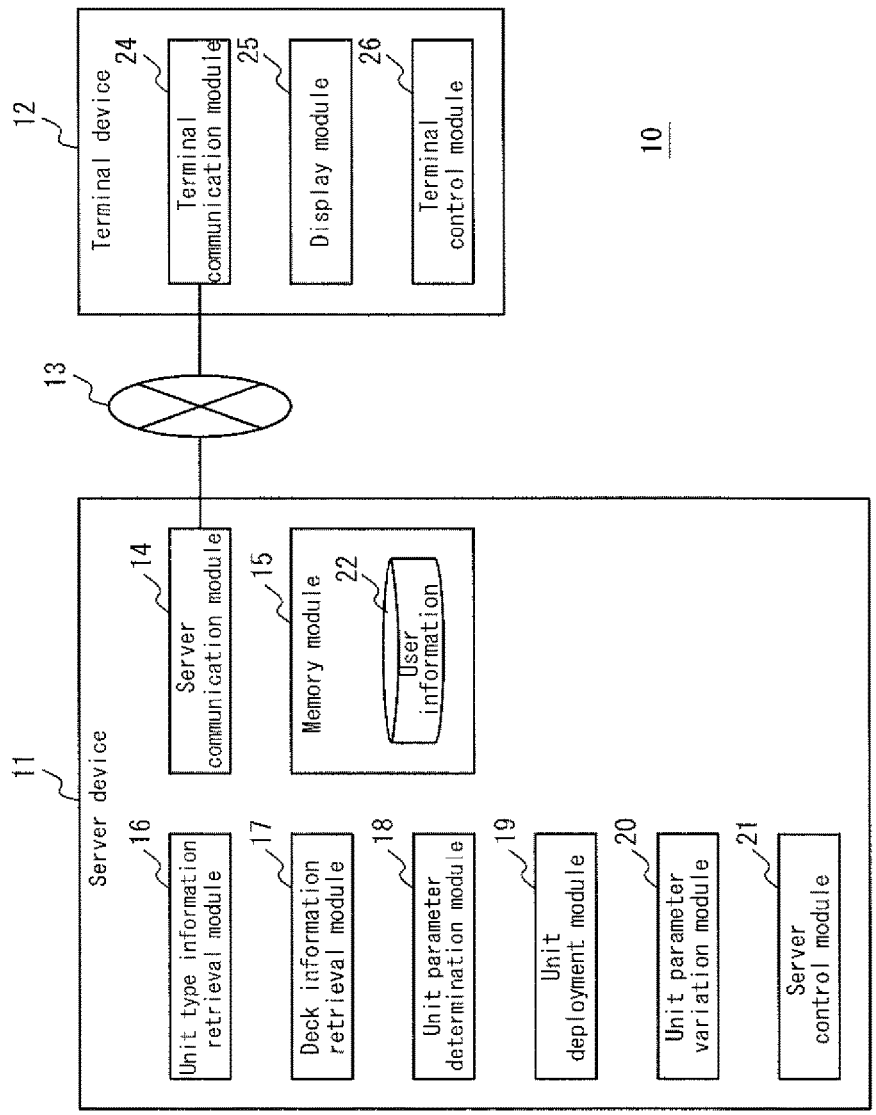
FIG. 1 is a block diagram of a game system according to an embodiment of the present invention.

Next, a game system including a server device according to an embodiment of the present invention is described. As illustrated in FIG. 1, a game system 10 includes a server device 11 and a plurality of terminal devices 12. The server device 11 and the terminal devices 12 can communicate with each other over a network 13.

The server device 11 includes a server communication module 14, a memory module 15, a unit type information retrieval module 16, a deck information retrieval module 17, a unit parameter determination module 18, a unit deployment module 19, a unit parameter variation module 20, and a server control module 21.

The server communication module 14 exchanges information with the terminal devices 12.

The memory module 15 stores user information 22. The user information 22 is information unique to a user and includes a variety of information used for progress of the game. For example as illustrated in FIG. 2, the user information 22 includes a plurality of unit parameters, information on cards in possession, deck information, unit type information, and group information, all associated with a user ID, which is the identifier of the user.

Figure 3:
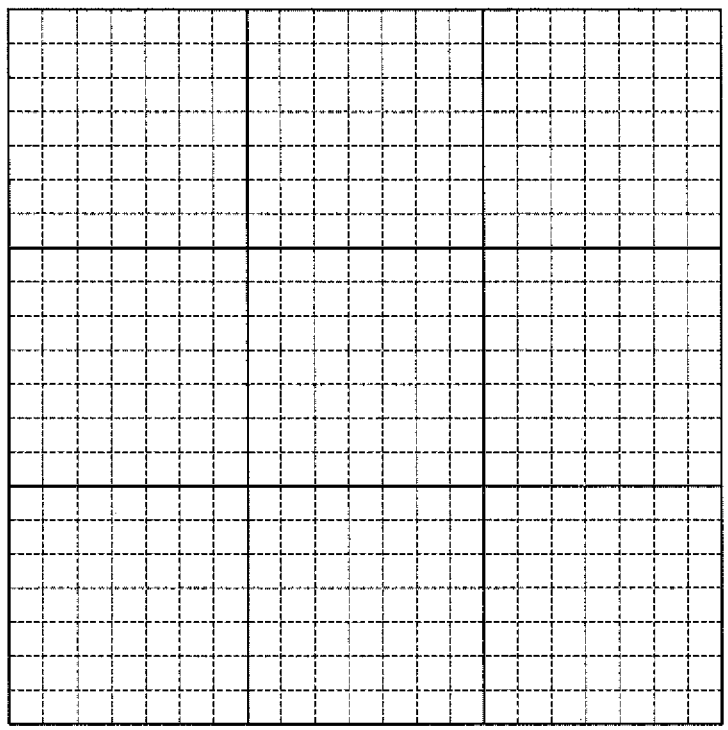
FIG. 3 illustrates an example of a field on which units are deployed within the game.

The unit parameters are parameters indicating characteristics of the unit, such as HP, AT, DF, movement range, and attack range. HP, AT, and DF respectively indicate the stamina (hit points), attack strength, and defense strength of the unit. For a unit deployed on the game field, which is divided into a plurality of squares (regions), the movement range and attack range respectively indicate the range in which the unit can move during one action (movement) and the range in which the unit can attack during one action (attack). For example, the field 23 illustrated in FIG. 3 is divided into 21 vertical squares by 21 horizontal squares and contains nine subfields that each include 7 vertical squares by 7 horizontal squares.

The information on cards in possession in FIG. 2 is information on all of the cards of which the user is in possession. FIG. 4 illustrates the content of the information on cards in possession (for example, "information on cards in possession 001"). For example, the information on cards in possession includes a plurality of card parameters (game medium parameters) and card attribute information (game medium attribute information), all associated with a card ID, which is the identifier of a card the user has in possession.

The card parameters are parameters indicating the strength of an individual card and for example include HP, AT, and DF. The card attribute information indicates the card attribute (game medium attribute) that a card has among a plurality of card attributes, such as "order", "nothing", "chaos", "adjacent", "distant", and "flight". The card attribute information is used in the below-described process to determine the unit parameters. In the present embodiment, there are six card attributes, "card attribute 1" through "card attribute 6", yet two or more card attributes are sufficient.

The deck information in FIG. 2 is information including, among all of the cards held by the user, a plurality of cards that the user has selected or that have been automatically selected. FIG. 5 illustrates the content of the deck information (for example, "deck information 001"). For example, the deck information includes card IDs, a plurality of card parameters, and card attribute information all associated with a unit parameter.

In the deck information illustrated in FIG. 5, a portion of the plurality of cards included in the deck is associated with each unit parameter. For example, three cards (card IDs "card 01" through "card 03") are associated with the HP of the unit. Three cards (card IDs "card 04" through "card 06") are associated with the AT of the unit. Finally, three cards (card IDs "card 07" through "card 09") are associated with the DF of the unit.

The unit type information in FIG. 2 is information indicating the unit type, such as "foot soldier", "archer", "cavalry", or the like. The user selects the unit type at the start of the battle from among a plurality of unit types. In the present embodiment, there are three unit types, yet two or more unit types are sufficient. For example as illustrated in FIG. 6, the movement range, attack range, and specialty card attribute corresponding to each unit type are determined in advance.

For a unit deployed on the field 23, the movement range and attack range listed in FIG. 6 respectively indicate the range in which the unit can move during one action (movement) and the range in which the unit can attack during one action (attack). During one action, the unit can either move or attack. For example, a unit that is of "unit type 1" can, during one action, move one square or attack a unit that is one square away. A unit that is of "unit type 2" can, during one action, move one square or attack a unit that is three squares away. A unit that is of "unit type 3" can, during one action, move two squares or attack a unit that is two squares away.

Each specialty card attribute indicates a predetermined card attribute. For example, the specialty card attributes associated with "unit type 1" are "card attribute 1" and "card attribute 2". The specialty card attributes associated with "unit type 2" are "card attribute 3" and "card attribute 4". The specialty card attributes associated with "unit type 3" are "card attribute 5" and "card attribute 6". The specialty card attributes are used in the below-described process to determine the unit parameters.

The group information listed in FIG. 2 is information indicating, for example, a group to which the user and the user's unit belong among a plurality of groups (types) in the game and is determined when the user begins the game. The group information is used in the process to vary the unit parameters described below. In the present embodiment, there are three groups, "group A", "group B", and "group C", yet two or more groups are sufficient.

The unit type information retrieval module 16 in FIG. 1 retrieves the unit type information from the terminal device 12. The unit type information retrieval module 16 stores the retrieved unit type information in the memory module 15 as a portion of the user information 22.

The deck information retrieval module 17 retrieves the deck information received from the terminal device 12. The deck information retrieval module 17 stores the retrieved deck information in the memory module 15 as a portion of the user information 22.

Based on the retrieved unit type information and deck information, the unit parameter determination module 18 performs a process to determine the unit parameters of the unit.

For example, the unit parameter determination module 18 determines the values of the movement range and the attack range of the unit listed in FIG. 2 to be the values of the movement range and the attack range, listed in FIG. 6, that correspond to the unit type indicated by the retrieved unit type information.

The unit parameter determination module 18 also determines the HP, AT, and DF of the unit listed in FIG. 2 based on a portion of the cards, among the plurality of cards included in the deck information, associated with each of these parameters.

In greater detail, based on the cards respectively associated with the plurality of unit parameters in the deck information, the unit parameter determination module 18 each calculates the total of the card parameters corresponding to each of the plurality of unit parameters. For example, the unit parameter determination module 18 calculates the HP of the unit as the total HP of the three cards (card IDs "card 01" through "card 03") associated with the HP of the unit in the deck information illustrated in FIG. 5. Similarly, the unit parameter determination module 18 calculates the AT and DF of the unit respectively as the total AT and total DF.

Next, when the card attribute of a card included in the deck information matches a predetermined card attribute, i.e. the specialty card attribute, corresponding to the unit type indicated by the unit type information, the unit parameter determination module 18 increases the unit parameters. For example, when the retrieved unit type information is "unit type 1", four cards included in the deck information illustrated in FIG. 5 (card IDs "card 01", "card 02", "card 07", and "card 08") match the specialty card attributes corresponding to "unit type 1" in FIG. 6 ("card attribute 1" or "card attribute 2"). In this case, the unit parameter determination module 18 increases the HP and DF of the unit associated with the four cards. The unit parameters are increased by, for example, adding a predetermined value or multiplying by a predetermined factor.

The unit parameter determination module 18 determines the HP, AT, and DF of the unit to be the totals or increased totals calculated as described above.

The unit deployment module 19 in FIG. 1 deploys the unit for which the unit parameters have been determined on the field 23 in the game at the start of a group battle. The position, on the field 23 at which the unit is deployed at the start of the group battle may differ for each group to which units belong, or all units may be deployed in the same position. Alternatively, when a user logs out and then restarts the game, the unit may be redeployed at the same position as when the user logged out.

During a battle, the unit parameter variation module 20 executes a process to vary the unit parameters of a first unit on the field 23 dynamically based on the group information associated with the first unit and the group information associated with a second unit on the field 23, the second unit having a predetermined positional relationship with the first unit. For example, the unit parameter variation module 20 varies the unit parameters of the first unit on the field 23 by increasing or decreasing the unit parameters when the second unit is positioned in an adjacent square to the first unit on the field 23. The increase or decrease in the unit parameters is determined based on the group information associated with each of a plurality of units. For example, when the second unit positioned in the adjacent square belongs to the same group as the first unit, the unit parameters of the first unit are increased. On the other hand, when the second unit positioned in the adjacent square belongs to a different group than the first unit, the unit parameters of the first unit are decreased. The unit parameters are increased or decreased by, for example, adding or subtracting a predetermined value or multiplying by a predetermined factor. Details on the process to vary the unit parameters are provided below.

The server control module 21 controls the overall operations of the server device 11. For example, when the number of users participating in the group battle reaches at least a predetermined number, i.e. when the number of units for which the unit parameters are determined reaches at least a predetermined number, the server control module 21 begins a process to conduct a group battle. The server control module 21 may also begin the process to conduct a group battle when the number of units of users belonging to each group reaches at least a predetermined number. During the process to conduct a battle, upon receiving an action request from a user via the terminal device 12, the server control module 21 causes a user's unit to act based on the action request. Furthermore, during the process to conduct a battle, upon receiving an accompaniment request that designates a unit other than a user's unit from the user via the terminal device 12, the server control module 21 causes the user's unit to act automatically by following the other unit so that the user's unit has a predetermined positional relationship with the other unit, for example by causing the user's unit to move to a square adjacent to the other unit.

The terminal device 12 includes a terminal communication module 24, a display module 25, and a terminal control module 26.

The terminal communication module 24 exchanges information with the server device 11.

The display module 25 is, for example, configured using a touch panel, displays a variety of game screens, and functions as an interface to receive user input by user operation.

The terminal control module 26 controls the overall operations of the terminal device 12. For example, based on user input received by the display module 25, the terminal control module 26 generates the unit type information, deck information, action requests, and accompaniment requests for the unit, transmitting these to the server device 11 via the terminal communication module 24. The action request is a request for causing the unit to execute an action selected by the user during the battle. The accompaniment request is a request to cause the user's unit to act automatically during the battle by following another unit designated by the user so that the user's unit has a predetermined positional relationship with the other unit, for example by causing the user's unit to move to a square adjacent to the other unit. Based on screen display instructions received from the server device 11, the terminal control module 26 displays a variety of game screens on the display module 25.

Process to Determine Unit Parameters

Next, the process to determine the unit parameters in the game system 10 is described with reference to the flowchart in FIG. 7.

First, the server control module 21 of the server device 11 transmits an instruction to display a screen to select the unit type to the terminal device 12 via the server communication module 14 (step S100).

Next, upon receiving the instruction in step S100, the terminal control module 26 of the terminal device 12 controls the display module 25 to display the screen to select the unit type (step S101) and receives a user operation to select the unit type. For example, the screen to select the unit type illustrated in FIG. 8 displays three unit types ("unit type 1" through "unit type 3"), unit type descriptions 27*a*, 27*b*, and 27*c* that indicate the corresponding specialty card attributes, and select buttons 28*a*, 28*b*, and 28*c* corresponding to the unit types. The user selects the user type by tapping one of the select buttons 28*a*, 28*b*, and 28*c*.

Subsequently, the terminal control module 26 of the terminal device 12 transmits unit type information indicating the unit type that the user selected in step S101 to the server device 11 via the terminal communication module 24 (step S102).

Next, the unit type information retrieval module 16 of the server device 11 retrieves the unit type information transmitted in step S102 (step S103) and stores the unit type information in the memory module 15 as a portion of the user information 22.

Subsequently, the server control module 21 of the server device 11 transmits an instruction to display a deck formation screen to the terminal device 12 via the server communication module 14 (step S104).

Figure 9:
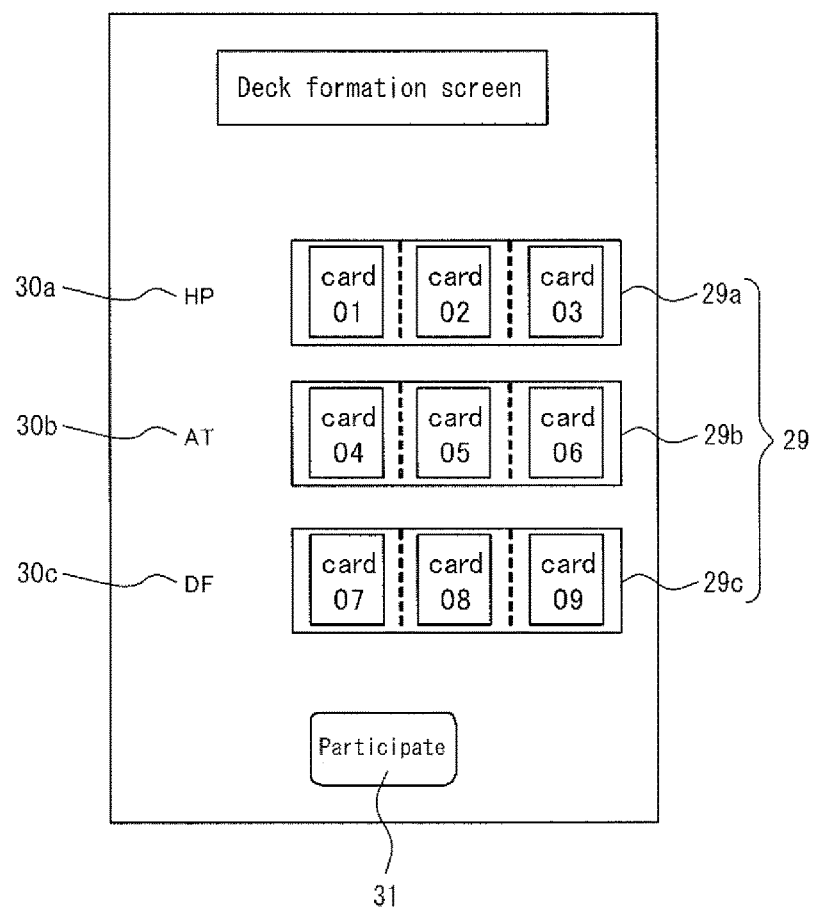
FIG. 9 illustrates an example of a game screen displayed on the display module in FIG. 1.

Next, upon receiving the instruction in step S104, the terminal control module 26 of the terminal device 12 controls the display module 25 to display the deck formation screen (step S105) and receives a user operation to form the deck using a plurality of cards. For example, the deck formation screen illustrated in FIG. 9 displays a deck formation region 29 (29*a*, 29*b*, 29*c*), unit parameter information 30*a*, 30*b*, and 30*c*, and a participate button 31. The user can place a maximum of nine cards in the deck formation region 29 and has placed "card 01" through "card 09" in FIG. 9. The unit parameter information 30*a*, 30*b*, and 30*c* is displayed near the deck formation regions 29*a*, 29*b*, and 29*c* and indicates the unit parameter (HP, AT, and DF) associated with the corresponding cards placed in the deck formation regions 29*a*, 29*b*, and 29*c*. After placing cards, the user completes deck formation by tapping the participate button 31.

Subsequently, the terminal control module 26 of the terminal device 12 transmits deck information indicating the plurality of cards deployed by the user in step S105 to the server device 11 via the terminal communication module 24 (step S106).

Next, the deck information retrieval module 17 of the server device 11 retrieves the deck information transmitted in step S106 (step S107) and stores the deck information in the memory module 15 as a portion of the user information 22.

Subsequently, based on the unit type information retrieved in step S103, the unit parameter determination module 18 of the server device 11 determines the movement range and the attack range of the unit (step S108).

Subsequently, based on the cards respectively associated with the plurality of unit parameters in the deck information retrieved in step S107, the unit parameter determination module 18 of the server device 11 calculates the unit parameters by calculating the total of the card parameters corresponding to each of the plurality of unit parameters (step S109).

Subsequently, the unit parameter determination module 18 of the server device 11 judges whether the card attribute of any of the cards included in the deck information retrieved in step S107 matches the specialty card attribute corresponding to the unit type indicated by the unit type information retrieved in step S103 (step S110). When the card attribute does not match for any of the cards included in the deck information (step S110: No), the process proceeds to step S112.

Conversely, when the card attribute matches for at least one card (step S110: Yes), the unit parameter determination module 18 increases the unit parameters calculated in step S109 (step S111). The parameters are increased by, for example, an increase of 10 points or an increase of 10%.

After step S111, or when the card attribute does not match for any of the cards included in the deck information in step S110 (step S110: No), the unit parameter determination module 18 determines the unit parameters to be the total values calculated in step S109 or the total values increased in step S111 (step S112).

Process to Vary the Unit Parameters

Next, the process to vary the unit parameters in the server device 11 is described.

Figure 10:
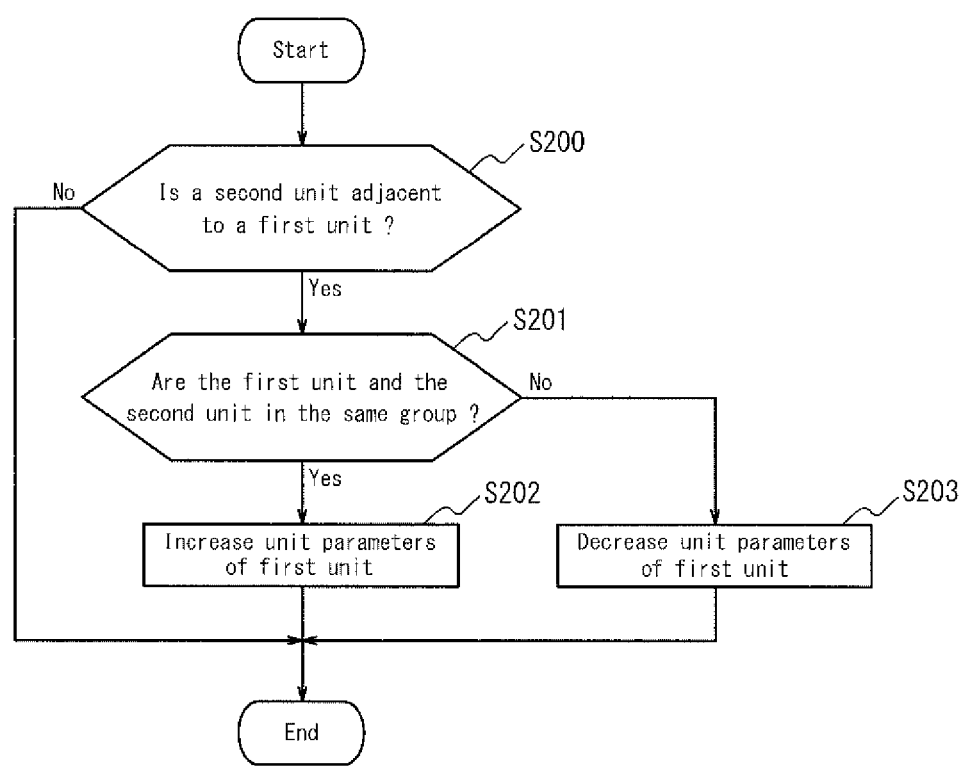
FIG. 10 is a flowchart illustrating operations of the game system in FIG. 1.

Referring to the flowchart in FIG. 10, the case of a first unit that is the target of unit parameter variation and a second unit differing from the first unit is described.

First, the unit parameter variation module 20 judges whether the second unit is positioned in a square adjacent to the first unit (step S200). When the second unit is not positioned in an adjacent square (step S200: No), the process terminates.

Conversely, when the second unit is positioned in an adjacent square (step S200: Yes), the unit parameter variation module 20 judges whether the first unit and the second unit belong to the same group (step S210).

When the group is the same in step S201 (step S201: Yes), the unit parameter variation module 20 varies the unit parameters of the first unit by increasing the unit parameters (step S202). The parameters are increased by, for example, an increase of 10 points or an increase of 10%.

Conversely, when the group is different in step S201 (step S201: No), the unit parameter variation module 20 varies the unit parameters of the first unit by decreasing the unit parameters (step S203). The parameters are decreased by, for example, a decrease of 10 points or a decrease of 10%.

Figure 11:
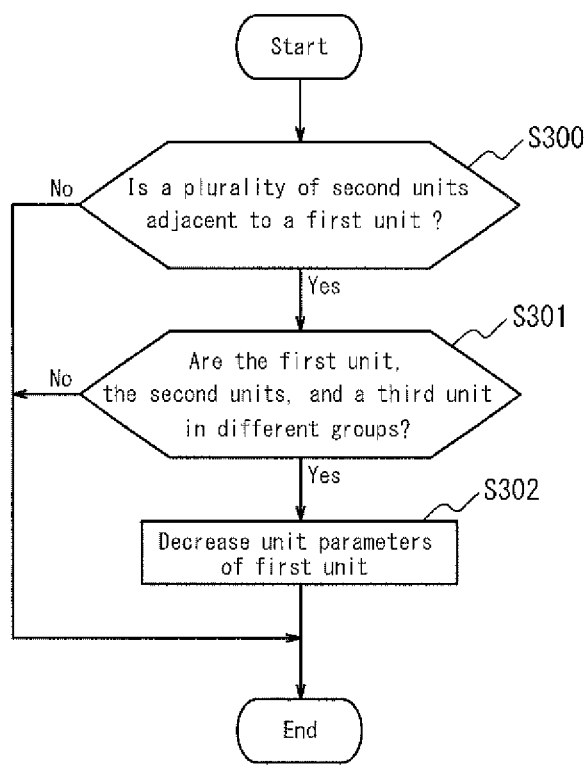
FIG. 11 is a flowchart illustrating operations of the game system in FIG. 1.

Next, referring to the flowchart in FIG. 11, the case of a first unit that is the target of unit parameter variation, a plurality of second units differing from the first unit, and a third unit that has been established as a target of attack by the first unit or that has established the first unit as a target of attack is described.

First, the unit parameter variation module 20 judges whether the plurality of second units is positioned in squares adjacent to the first unit (step S300). When the plurality of second units is not positioned in adjacent squares (step S300: No), the process terminates.

Conversely, when the plurality of second units is positioned in adjacent squares (step S300: Yes), the unit parameter variation module 20 judges whether the first unit, the plurality of second units, and the third unit belong to different groups (step S301). When the first through third units do not belong to different groups (step S301: No), the process terminates.

Conversely, when the first through third units belong to different groups in step S301 (step S301: Yes), the unit parameter variation module 20 varies the unit parameters of the first unit by decreasing the unit parameters (step S302).

The parameters are decreased by, for example, a decrease of 10 points or a decrease of 10%.

Figure 12:
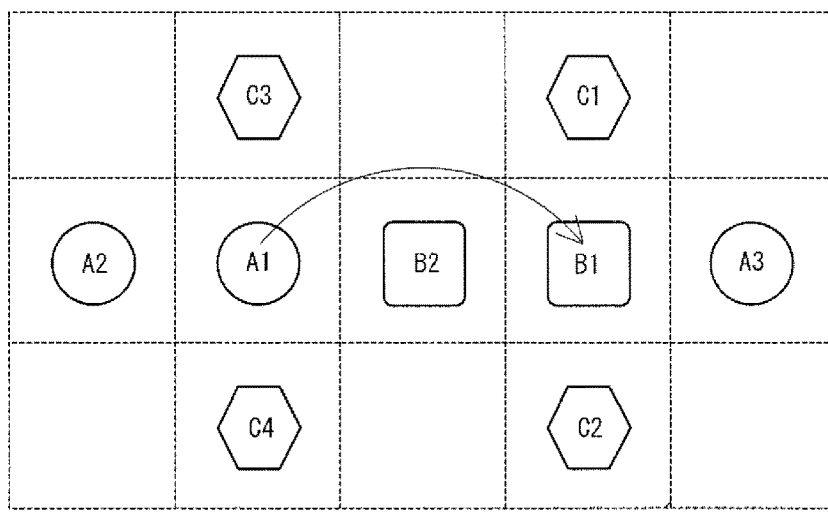
FIG. 12 illustrates operations of the game system in FIG. 1.

The steps in the above-described process to vary the unit parameters are executed in combination. For example, the following concretely describes the circumstances illustrated in FIG. 12, in which a plurality of units A2, A3, B2, C1, C2, C3, and C4 (for example, second units) are positioned in squares adjacent to unit A1 (for example, a first unit) that is attacking unit B1 (for example, a third unit), which is the target of attack. The codes A, B, and C for the units indicate the groups A, B, and C to which the units belong.

In this case, the unit parameters for unit A1, for example, vary due to the presence of units A2, B2, C3, and C4 positioned in squares adjacent to unit A1. Specifically, due to the presence of a unit (unit A2) belonging to the same group (group A) as unit A1, the parameters are expected to increase once, for example by an increase of 10 points or an increase of 10%. Due to the presence of a unit (unit B2) belonging to a different group (group B) than group A1, the parameters are expected to decrease once, for example by a decrease of 10 points or a decrease of 10%. Furthermore, since there are a plurality of units (units C3, C4) belonging to a different group (group C) than both unit A1 and unit B1, the parameters are expected to decrease once, for example by a decrease of 10 points or a decrease of 10%. Accordingly, by increasing once and decreasing twice, the unit parameters of unit A1 end up being decreased once, for example by a decrease of 10 points or a decrease of 10%, and unit A1 attacks unit B1 in this decreased state.

Process to Conduct a Battle

Figure 13:
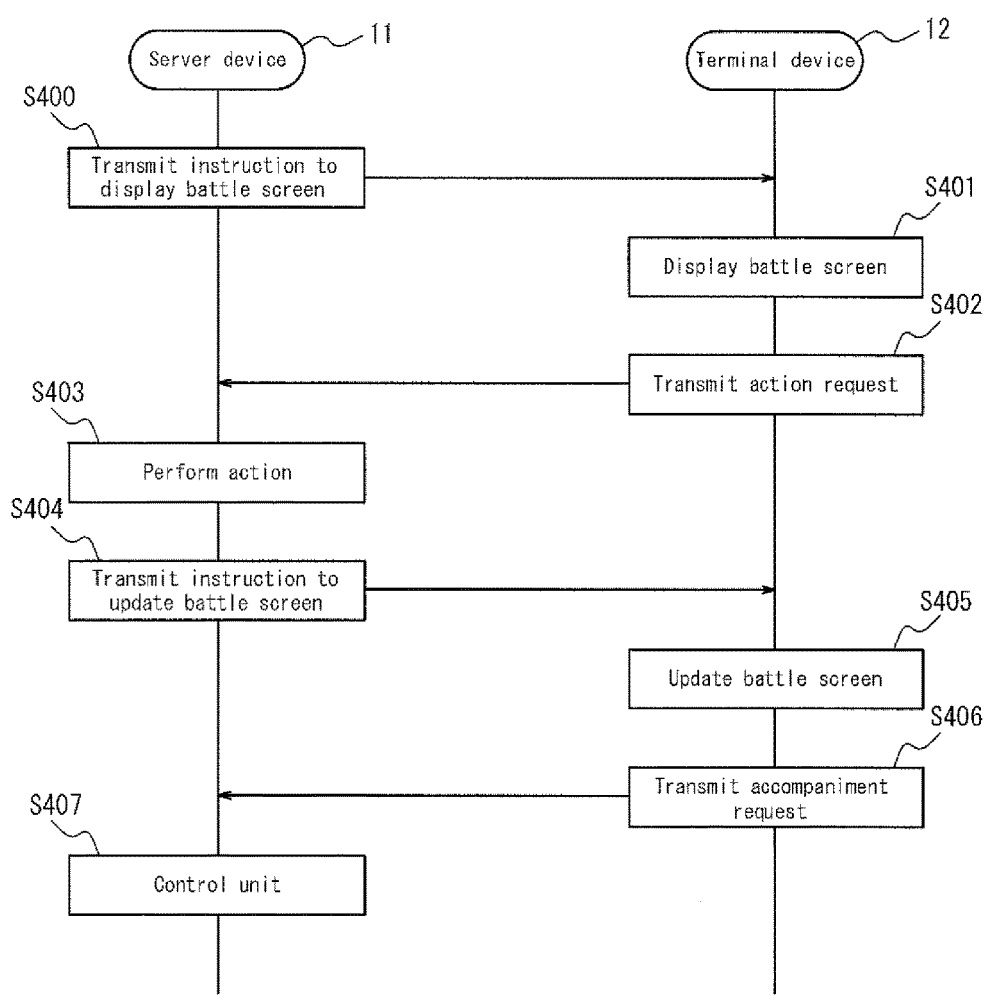
FIG. 13 is a flowchart illustrating operations of the game system in FIG. 1.

Next, the process to conduct a battle in the game system 10 is described with reference to the flowchart in FIG. 13.

First, the server control module 21 of the server device 11 transmits an instruction to display a battle screen to the terminal device 12 via the server communication module 14 (step S400).

Figure 14:
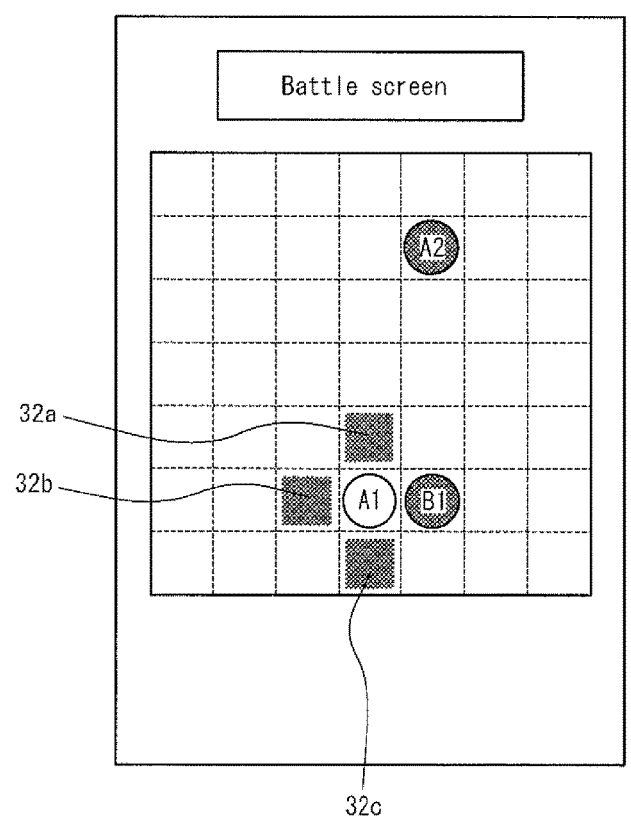
FIG. 14 illustrates an example of a game screen displayed on the display module in FIG. 1.

Next, upon receiving the instruction in step S400, the terminal control module 26 of the terminal device 12 controls the display module 25 to display the battle screen (step S401) and receives a user operation to select an action for the unit. For example, in the battle screen illustrated in FIG. 14, three squares 32a, 32b, and 32c to which the user can move the unit A1, another unit B1 that the unit A1 can attack, and another unit A2 that the unit A1 can accompany are all displayed flashing. The user selects whether to move, attack, or accompany by tapping one of the flashing squares 32a, 32b, and 32c to which the unit A1 can move or one of the other flashing units. It is assumed that the user selects the destination of movement by tapping the flashing square 32b to which the unit A1 can move.

Subsequently, the terminal control module 26 of the terminal device 12 generates an action request to move the unit A1 to the destination designated by the user in step S401 and transmits the action request to the server device 11 via the terminal communication module 24 (step S402).

Next, upon receiving the action request transmitted in step S402, the server control module 21 of the server device 11 performs the action (movement) indicated in the action request on the unit A1 (step S403).

Subsequently, the server control module 21 of the server device 11 transmits an instruction to update the battle screen to the terminal device 12 via the server communication module 14 (step S404).

Figure 15:
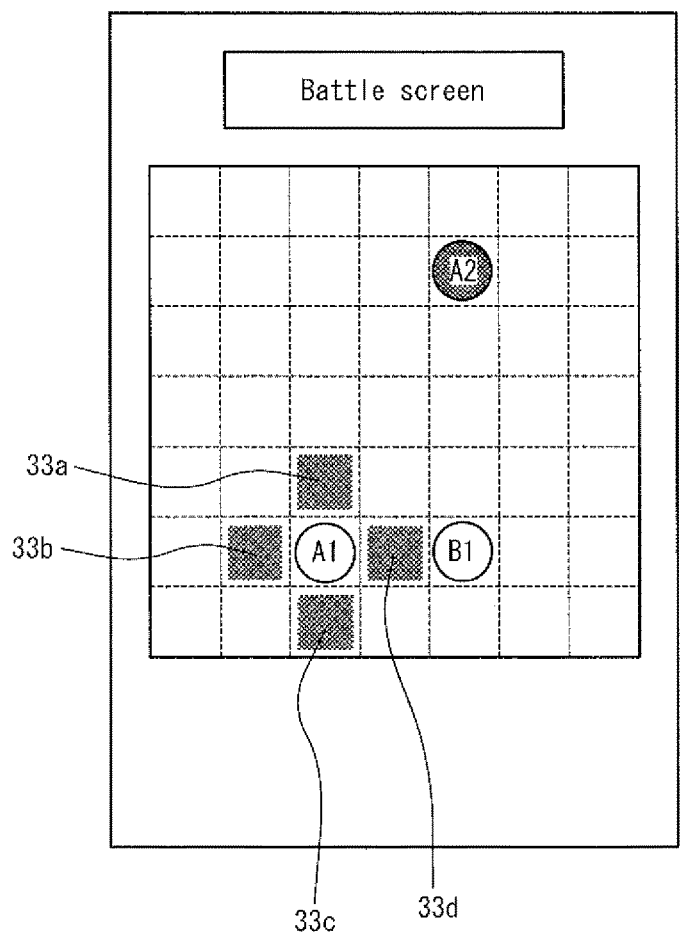
FIG. 15 illustrates an example of a game screen displayed on the display module in FIG. 1.

Next, upon receiving the instruction in step S404, the terminal control module 26 of the terminal device 12 controls the display module 25 to update the battle screen (step S405) and receives a user operation to select an action for the unit A1. For example, in the battle screen illustrated in FIG. 15, four squares 33a, 33b, 33c, and 33d to which the user can move the unit A1 and another unit A2 that the unit A1 can accompany are all displayed flashing. The user selects whether to move or accompany by tapping one of the flashing squares 33a, 33b, 33c, and 33d to which the unit A1 can move or the flashing unit A2. It is assumed that the user designates a unit for the unit A1 to accompany by tapping the unit A2.

Subsequently, the terminal control module 26 of the terminal device 12 generates an accompaniment request to cause the unit A1 to accompany the other unit A2 designated by the user in step S405 and transmits the accompaniment request to the server device 11 via the terminal communication module 24 (step S406).

Upon receiving the accompaniment request transmitted in step S406, the server control module 21 of the server device 11 controls the unit A1 to act automatically so that the unit A1 moves to a square adjacent to the other unit A2 indicated in the action request (step S407).

In this way, the server device 11 in the present embodiment varies the unit parameters in accordance with the positional relationship between a plurality of units on the field 23, thereby allowing for dynamic variation of the unit parameters in accordance with units moving on the field 23. Furthermore, since the game becomes more strategic by users cooperating, the game also becomes more interesting.

In accordance with the group information associated with each unit, the server device 11 determines whether to increase or decrease the unit parameters being varied. For example, since the unit parameters are increased when a plurality of units belonging to the same group are adjacent to each other, even a user who does not hold cards with high card parameters can actively participate. Hence, the user's interest in the game can be enhanced.

Since the unit parameters are decreased when, for example, a unit belonging to another group is adjacent, it becomes important for a plurality of users belonging to the same group to cooperate, thereby encouraging communication between users.

When a first through a third unit belonging to different groups are present, the second unit, for example, can take sides with either the first unit or the third unit that are attacking each other. If a plurality of second units are adjacent to the first unit, it is very probable that the second units will side with the third unit and attack the first unit. In this case, the server device 11 reduces the unit parameters of the first unit, thereby reflecting the intention of the user operating the second unit who wishes to take sides with the third unit.

Upon receiving an accompaniment request from the terminal device 12, the server device 11 causes the user's unit to act automatically so that the user's unit has a predetermined positional relationship with the other unit indicated in the accompaniment request, for example by causing the user's unit to move to a square adjacent to the other unit. It is thus possible to maintain an increase in the unit parameters via the process to vary the unit parameters by having the user's unit automatically follow another unit even when, for example, the user is away from the terminal device 12 (when the user cannot participate in the game), thereby enhancing user-friendliness. A user whose unit is being accompanied may also find game operations to be more satisfying, since in addition to the user's own unit, the user is also in charge of operating another user's unit.

During the process to determine the unit parameters, the server device 11 determines each of a plurality of unit parameters of the unit based on a portion of a plurality of cards included in the deck information. This increases the occasions for using a card that is not frequently used in a regular battle, in which individual cards are used, due to the card parameters being unbalanced, such as the HP being high yet the AT and DF being extremely low. The user's interest in the game can thus be enhanced.

The server device 11 increases the unit parameters when the card attribute of a card included in the deck information matches a predetermined card attribute (specialty card attribute) corresponding to the unit type indicated by the unit type information. Since the user can thus increase unit strength by appropriately selecting the unit type, it is possible to make the game more interesting.

Although the present invention has been described based on drawings and examples, it is to be noted that various changes and modifications will be apparent to those skilled in the art based on the present disclosure. Therefore, such changes and modifications are to be understood as included within the scope of the present invention. For example, the functions and the like included in the various units and steps may be reordered in any logically consistent way. Furthermore, units or steps may be combined into one or divided.

For example, in the above embodiment, the deck information includes information on a plurality of cards, yet the deck information may be configured to include only card IDs of a plurality of cards.

The field 23 may, for example, be divided into hexagons. Alternatively, the field 23 may be a three-dimensional space.

In the above embodiment, the unit parameter variation module 20 varies the unit parameters of a unit in accordance with the presence of another unit positioned in the square adjacent to the unit, yet the other unit is not limited to being in an adjacent square. The unit parameters may be varied in accordance with the presence of another unit having a predetermined positional relationship with a certain unit. For example, in addition to when a unit is present in an adjacent square, the parameter may be varied when another unit is present within the attack range of a unit, when a plurality of units in a predetermined formation are present on the field 23, or when a plurality of units surround a stronghold on the field 23.

In the above embodiment, the unit parameter variation module 20 determines whether to increase or decrease the unit parameters based on group information associated with each of a plurality of units, yet an increase or decrease in the unit parameters may be determined regardless of the group information. For example, an ally or enemy may be judged based on a unit's activity history, with the unit parameters being increased in the case of an ally and decreased in the case of an enemy.

A computer may be suitably used to function as the server device 11. A program containing the processing for achieving the functions of the server device 11 is stored in the memory module 15 of the computer, and the functions are achieved by the central processing unit (CPU) of the computer reading and executing the program.

REFERENCE SIGNS LIST

10: Game system
11: Server device
12: Terminal device
13: Network
14: Server communication module
15: Memory module
16: Unit type information retrieval module
17: Deck information retrieval module
18: Unit parameter determination module
19: Unit deployment module
20: Unit parameter variation module
21: Server control module
22: User information
23: Field
24: Terminal communication module
25: Display module
26: Terminal control module
27a, 27b, 27c: Unit type description
28a, 28b, 28c: Select button
29, 29a, 29b, 29c: Deck formation region
30a, 30b, 30c: Unit parameter information
31: Participate button
32a, 32b, 32c: Square to which a unit can move
33a, 33b, 33c, 33d: Square to which a unit can move

The invention claimed is:

1. A non-transitory computer readable recording medium having stored thereon instructions to be executed on a computer, the instructions causing the computer to perform steps of:
deploying a plurality of units on a field displayed on a display, the plurality of units belonging to a first group among a plurality of groups;
automatically moving a second unit among the plurality of units such that the second unit, which together with a first unit among the plurality of units do not currently satisfy a first positional relationship on the display, is moved so as to satisfy the first positional relationship on the display;
after automatically moving the second unit so as to satisfy the first positional relationship, automatically controlling the second unit to follow the first unit so as to maintain the first positional relationship;
when the first unit and the second unit satisfy the first positional relationship on the display, varying a parameter set for the first unit; and
attacking a stronghold on the field using the first unit and/or the second unit, wherein
the automatically controlling of the second unit to follow the first unit maintains parameter variation for the first unit.

2. The non-transitory computer readable recording medium according to claim 1, wherein
the varying of the parameter includes increasing a stamina.

3. The non-transitory computer readable recording medium according to claim 1, wherein
the automatically controlling of the second unit to follow the first unit is performed in response to a player's command.

4. The non-transitory computer readable recording medium according to claim 1, wherein
the instructions further cause the computer to perform a step of adding a point to the first group when the stronghold is captured by the first unit and/or the second unit.

5. A game control method implemented by a computer, the method comprising the steps of:
deploying a plurality of units on a field displayed on a display, the plurality of units belonging to a first group among a plurality of groups;

automatically moving a second unit among the plurality of units such that the second unit, which together with a first unit among the plurality of units do not currently satisfy a first positional relationship on the display, is moved so as to satisfy the first positional relationship on the display;

after automatically moving the second unit so as to satisfy the first positional relationship, automatically controlling the second unit to follow the first unit so as to maintain the first positional relationship;

when the first unit and the second unit satisfy the first positional relationship on the display, varying a parameter set for the first unit; and attacking a stronghold on the field using the first unit and/or the second unit, wherein the automatically controlling of the second unit to follow the first unit maintains parameter variation for the first unit.

6. The game control method according to claim 5, wherein the varying of the parameter includes increasing a stamina.

7. The game control method according to claim 5, wherein the automatically controlling of the second unit to follow the first unit is performed in response to a player's command.

8. The game control method according to claim 5, further comprising
a step of adding a point to the first group when the stronghold is captured by the first unit and/or the second unit.

9. A game control system comprising:
a unit deploy module configured to deploy a plurality of units on a field displayed on a display, the plurality of units belonging to a first group among a plurality of groups;

a controller configured to
automatically move a second unit among the plurality of units such that the second unit, which together with a first unit among the plurality of units do not currently satisfy a first positional relationship on the display, is moved so as to satisfy the first positional relationship on the display, and after automatically moving the second unit so as to satisfy the first positional relationship, automatically control the second unit to follow the first unit so as to maintain the first positional relationship; and a unit parameter variation module configured to, when the first unit and the second unit satisfy the first positional relationship on the display, vary a parameter set for the first unit, wherein the first unit and/or the second unit attack a stronghold on the field, and the automatically controlling of the second unit to follow the first unit by the controller maintains parameter variation for the first unit.

10. The game control system according to claim 9, wherein
the varying of the parameter includes increasing a stamina.

11. The game control system according to claim 9, wherein
the automatically controlling of the second unit to follow the first unit is performed by the controller in response to a player's command.

12. The game control system according to claim 9, wherein
a point is added to the first group when the stronghold is captured by the first unit and/or the second unit.

* * * * *